W. E. HARRIS.
AUTOMATIC SPRINKLING APPARATUS.
APPLICATION FILED MAR. 2, 1912.
1,056,901.
Patented Mar. 25, 1913.
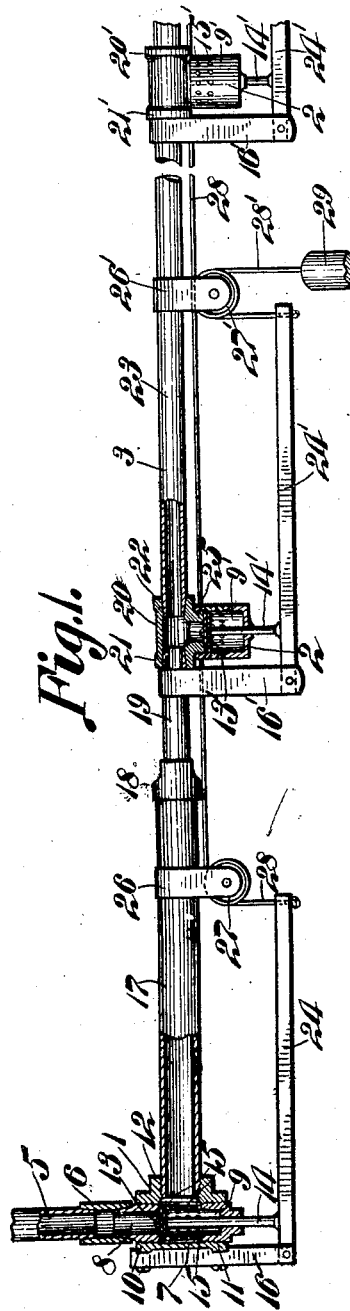
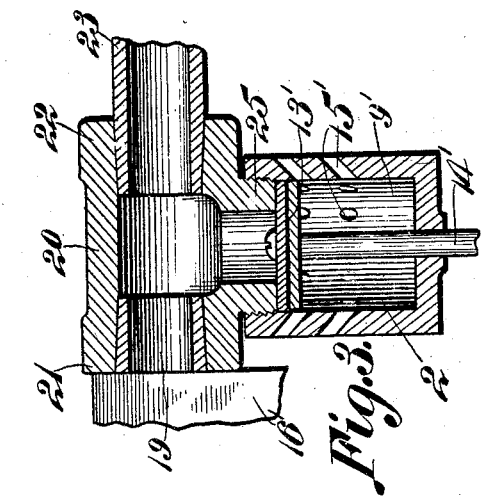
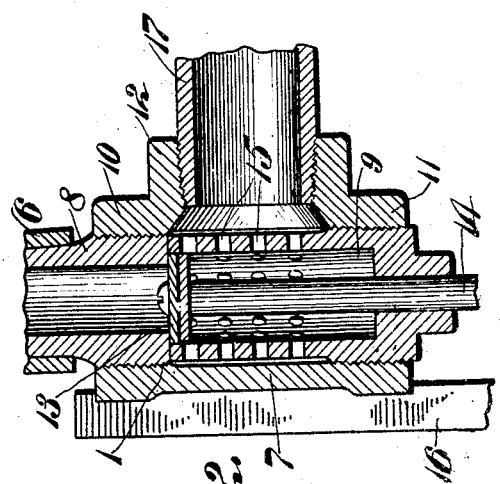
Witnesses
W. E. Harris,
Inventor
by C. A. Snow & Co.
Attorneys

UNITED STATES PATENT OFFICE.

WILLIAM E. HARRIS, OF HARRISBURG, NORTH CAROLINA.

AUTOMATIC SPRINKLING APPARATUS.

1,056,901. Specification of Letters Patent. Patented Mar. 25, 1913.

Application filed March 2, 1912. Serial No. 681,187.

*To all whom it may concern:*

Be it known that I, WILLIAM E. HARRIS, a citizen of the United States, residing at Harrisburg, in the county of Cabarrus and State of North Carolina, have invented a new and useful Automatic Sprinkling Apparatus, of which the following is a specification.

This invention relates to automatic sprinkling apparatuses, and has for its primary object to provide a novel and improved master valve for controlling the passage of water or other fluid through the piping to the sprinkling devices beyond the said master valve, whereby the master valve may be opened when any one of the sprinkling devices is brought into operation.

With the foregoing and other objects in view which will be apparent as the invention is better understood, this invention is embodied in the novel construction and combination of parts elicited in the following description and hereinafter claimed, it being understood that this apparatus is susceptible of numerous alterations or deviations in its details within the scope of the appended claims without departing from the spirit of the invention.

The invention is illustrated in its preferred embodiment in the accompanying drawings, wherein similar reference characters designate corresponding parts, and wherein—

Figure 1 is an elevation of a portion of the apparatus, parts being broken away. Fig. 2 is a sectional detail of the master valve. Fig. 3 is a sectional detail taken through one of the sprinkling devices.

Referring specifically to the drawings, the numeral 5 designates a supply pipe, which is connected to a tank, water main or other supply of water or other fire extinguishing fluid. A vertical master valve, designated generally by the numeral 1, is connected to the vertical supply pipe 5, and the horizontal sprinkling pipe, designated generally by the numeral 3, is connected to the master valve 1, this sprinkling pipe 3 having a plurality of sprinkling devices, designated generally by the numeral 2. The master valve embodies a T-coupling 7 forming a valve casing, which has a nipple or tail piece 8 screw threaded or engaged in the upper end, designated 10, this nipple 8 being connected to the supply pipe 5 by means of a coupling 6. A cylinder 9 is engaged or screw threaded into the outer or lower end 11 of the casing 7 and has a plurality of perforations or orifices 15 therein. The inner end of the cylinder 9 abuts against the inner end of the nipple 8 and the outer end of the said cylinder is closed. The external diameter of the cylinder is reduced from the inner end thereof to a point short of its outer end, to provide an annular chamber between the cylinder and the T-coupling, and the internal diameter of the cylinder is greater than that of the nipple. A piston or valve 13 is slidable in the cylinder 9 and is adapted to seat against the inner end of the nipple 8 thereby cutting off the communication from the supply pipe 5 into the cylinder 9. The section 17 of the sprinkling pipe is engaged to the angular arm 12 of the valve casing or T-coupling 7, and a piston rod or stem 14 is attached to the piston or valve 13 and passes through the outer end of the cylinder 9, the said piston and piston rod being adapted to reciprocate. The sprinkling pipe communicates with the cylinder 9 through the perforations or orifices 15, and when the piston 13 is seated against the nipple 8, communication is shut off between the supply pipe 5 and the sprinkling pipe, but when the piston 13 is moved outwardly or away from the nipple 8, communication is established between the supply 5 and the sprinkling pipe 3 through the cylinder 9 and the perforations 15.

A reducing coupling 18 is connected to the pipe section 17, and a pipe section 19 is connected to the reducing coupling 18, this pipe section 19 being connected to one end 21 of a T-coupling 20. This T-coupling 20 has a pipe section 23 connected to the other end 22 thereof, which pipe section is in turn connected to the end 21 of T-coupling 20'. These pipe sections 17, 19 and 23 combine to form the sprinkling pipe 3.

The sprinkling devices are combined with the couplings 20 and 20', and consist of vertical cylinders or cups 9' having upwardly inclined apertures or orifices 15' therein, which cylinders have their upper ends or mouths screw threaded or engaged upon the angular arms 25 of the said couplings, these angular arms 25 depending from the sprinkling pipe 3 to permit the cylinders 9' to depend therefrom. The outer or lower ends of each of the cylinders 9' is closed, and a piston or valve 13' is slidable within the cylinder 9' and is adapted to seat against the end of the arm 25 of the coupling and thereby close off the communication from the coupling into the cylinder. A piston rod or stem 14' is attached to each piston or valve 13' and passes through the outer end of the cylinder. The cylinders or cups are of uniform diameter throughout and the outlet apertures are arranged in a plurality of annular series at intervals along the length thereof, in order that the piston may work snugly in the cylinder or cup so as to slide past the apertures successively. The piston in working snugly in the cylinder or cup and the piston rod in passing slidably through the outer end of the cylinder or bottom of the cup, prevents the piston from being shifted or displaced laterally so as to bind the piston rod within the outer end of the cylinder or bottom of the cup. This also provides for the smooth working of the device, it being noted that as the piston is forced outwardly or away from the T-coupling, the air ahead of the piston will be forced out of the outlet apertures beyond the piston, so as not to retard the travel of the piston, and as the piston reaches the outer portion of the cylinder, the air in the outer end of the cylinder will form the cushion to prevent the piston from striking the end of an air cylinder with sufficient force to cause any injuries.

Each of the sprinkling devices is normally closed by a novel means which will be directly described and which is automatically operable to permit the respective sprinkling device to open upon a predetermined rise of the temperature in the vicinity of the sprinkling device, due to fire or other causes. This means consist in a lever 24' fulcrumed or pivoted to a hanger 16' attached to the sprinkling pipe, and which lever bears against the outer end of the corresponding piston rod or plunger rod 14' parallel with the sprinkling pipe, and a fusible or destructible cord 28' is connected to the outer or free end of the lever 24' and passes over a pulley mounted in a hanger 26' attached to the sprinkling pipe, which cord 28' has a weight 29 attached to its free end for swinging the lever 24' upward or toward the sprinkling pipe 3 to force the piston rod or plunger rod 14' inwardly and thereby seat the piston 13' against the angular arm 25 of the T-couplings 20 or 20', whichever the case may be. An explosive cap 30 is arranged at the lower end of the weight 29, and when the cord 28' is severed, the weight 29 will drop and in striking an object will cause the cap 30 to be discharged or set off to cause an explosion or to give an audible signal.

The master valve is also provided with means whereby the same will be normally held closed and which means is automatically operable to permit the master valve to open when one of the sprinkling devices is brought into operation, which means consists in the structure to be directly described. This means consists in a lever 24 fulcrumed or pivoted to a hanger 16 secured to the T-coupling or valve casing 7 opposite the sprinkling pipe, which lever 24 swings against the outer end of piston rod or plunger rod 14 parallel with the sprinkling pipe and has a fusible or destructible cord 28 attached or connected to the free or outer end thereof, this cord 28 passing over a pulley 27 mounted in a hanger 26 secured to the sprinkling pipe. This cord 28 extends longitudinally of the sprinkling pipe and passes into a contiguous relation with each of the cords 28' of the sprinkling devices and is normally under tension to swing the lever 24 upwardly or inwardly toward the sprinkling pipe 3 to force the piston rod or plunger rod 14 inwardly and thereby seat the piston 13 against the nipple 8.

In operation, the master valve and sprinkling devices are normally closed, and should the temperature in vicinity of one of the sprinking devices rise to a predetermined or abnormal degree due to fire or other causes, the corresponding cord 28' will be fused or destructed, which change will cause the cord to be severed. This severing of the cord 28' will permit the lever 24' to drop or swing away from the sprinkling pipe 3, in which event, the piston rod or plunger rod 14' will be free to slide outwardly, the fluid pressure forcing the piston 13' outwardly within the cylinder 9'. This outward movement of the piston 13' will establish a communication from the sprinkling pipe 3 into the cylinder 9'. Simultaneously with the movement of the lever 24', the weight 29 will drop, which when the said weight strikes an object will cause the cap 30 to be discharged to give an audible signal, warning those within hearing thereof of the fire or other impending danger. The cord 28 extending into a contiguous relation with each of the cords 28' will be fused or severed simultaneously with the cords 28', which will permit the lever 24 to drop or swing away from the sprinkling pipe 3, in which event, the piston rod or plunger rod 14 will be free to slide outward. The water pressure within the supply pipe 5 will therefore force the piston 13 away from the nipple 8 and toward the outer end of the cylinder 9, which will establish a communication from the supply pipe 5 into the cylinder 9 through the end thereof, and then through the apertures or perforations 15 into the sprinkling pipe 3. The water or other fluid will then rush into the sprinkling pipe and into the sprinkling device which has been opened, to permit the water to be sprayed or discharged through the apertures or orifices 15' of the cylinder 9'. In this manner, should a fire break out or an explosion occur in the vicinity of one of the sprinkling devices, the corresponding cord 28' will be severed and the cord 28 will also be severed simultaneously, which will permit the valve of the sprinkling device to open and which will permit the master valve to open simultaneously therewith to permit the water to pass into the sprinkling pipe and out of the sprinkling device to extinguish the flame or flames. The master valve 1, therefore, controls the passage of the water through the piping and being normally closed withholds the water from the sprinkling pipes. This is of advantage for the reason that the sprinkling pipe is usually exposed, with a tendency of the water therein to freeze. With the apparatus as described, the water is withheld from the sprinkling pipe until necessity requires, when the master valve is opened to permit the water to rush into the sprinkling pipe and be discharged through the sprinkling device or devices. It will also be seen, that each of the sprinkling devices is normally closed, and upon the water entering the sprinkling pipe, the same will only be discharged from the sprinkling device which has been opened.

In use, the sprinkling pipe 3 is passed through the room or other locality to be protected against fire, preferably along the ceiling or along one of the walls, and it is understood that numerous sprinkling pipes may be provided, either for one room, or for the various rooms or offices of a building, all of which sprinkling pipes may be controlled with one master valve, or with a plurality of master valves, as may be desired or essential, and which will be apparent to those skilled in the art. It is also understood, that the cords 28 and 28' may be extended, by means of pulleys or other guides, to various localities within the room or rooms, in which localities fires or other damaging activities are liable to occur. In thus extending the cords 28 and 28', the severing of the cords is assured, and it is also understood that the cords 28 and 28' may not only be severed by a rise in temperature, but also by an explosion, or by other similar means.

Having described the invention, what is claimed as new is:

1. In an apparatus of the character described, a T-coupling, a nipple screw-threaded into one end of the T-coupling and adapted to be connected to a supply pipe, a perforated cylinder screw-threaded into the other end of the coupling with its inner end abutting against the nipple and having its outer end closed, a piston in the cylinder seatable against the nipple, and a piston rod attached to the piston and passing slidably through the outer end of the cylinder for control by temperature governed means, the angular arm of the T-coupling being adapted for the attachment of a sprinkling pipe.

2. In an apparatus of the character described, a T-coupling, a nipple screw threaded into one end of the T-coupling, and adapted to be connected to a supply pipe, a perforated cylinder screw-threaded into the other end of the coupling with its inner end abutting against the inner end of the nipple, the outer end of the cylinder being closed, the external diameter of the cylinder being reduced from the inner end to a point short of its outer end, and the internal diameter of the cylinder being greater than that of the nipple, a piston in the cylinder seatable against the inner end of the nipple, and a piston rod attached to the piston and passing slidably through the outer end of the cylinder for control by a temperature governed means, the angular arm of the T-coupling being adapted for the attachment of a sprinkling pipe.

In testimony that I claim the foregoing as my own, I have hereto affixed my signature in the presence of two witnesses.

WILLIAM E. HARRIS.

Witnesses:
 JOHN P. ALLISON,
 JAMES F. HONEYCUTT.